United States Patent [19]
Swan, Jr. et al.

[11] 3,917,122
[45] Nov. 4, 1975

[54] HEATING DEVICE FOR CUSTOM FITTING A SKI BOOT

[75] Inventors: Jack C. Swan, Jr.; Donald W. Bertetto; Chris A. Hanson, all of Boulder, Colo.

[73] Assignee: Hanson Industries Inc., Boulder, Colo.

[22] Filed: Mar. 4, 1974

[21] Appl. No.: 447,519

[52] U.S. Cl. ....... 222/146 HE; 36/2.5 AL; 222/394; 126/343.5 A; 219/421; 219/439; 425/144
[51] Int. Cl.² ........................................ B05C 9/02
[58] Field of Search .......... 425/242, 247, 119, 295, 425/23, 24, 25, 243, 143, 144; 126/343.5 A; 219/420, 421, 422, 424, 425, 426, 439, 440, 219/441, 442; 222/146, 146 HE, 394; 36/2.5 AL; 12/142 P; 264/222

[56] References Cited
UNITED STATES PATENTS

| | | | |
|---|---|---|---|
| 2,271,188 | 1/1942 | Franz | 219/421 |
| 2,809,772 | 10/1957 | Weisz | 222/146 HE |
| 3,095,605 | 7/1963 | Finelt | 425/143 |
| 3,377,466 | 4/1968 | Paulsen | 219/421 |
| 3,412,903 | 11/1968 | VanRiper, Jr., et al. | 222/146 HE |
| 3,585,361 | 6/1971 | Rosen et al. | 219/421 |
| 3,614,389 | 10/1971 | Malisza | 219/421 |
| 3,662,927 | 5/1972 | Cocks | 222/146 HE |
| 3,736,612 | 6/1973 | Check et al. | 12/142 P |
| 3,769,392 | 10/1973 | Tessaro | 36/2.5 AL X |
| 3,792,801 | 2/1974 | Baker et al. | 222/146 HE |

Primary Examiner—Volodymyr Y. Mayewsky
Attorney, Agent, or Firm—Merriam, Marshall, Shapiro & Klose

[57] ABSTRACT

A melting and filling unit is provided for liquefying wax bars, or other suitable fitting materials, which are used in the custom fitting of ski boots. The melting unit includes a metallic heating pot which is encapsulated within a thermoplastic shroud having both a base unit which receives the heating pot and a pivotally attached cover unit. The pot includes integrally formed heating fins and is closed with a cover which may be locked into a sealing relationship with the heating pot. Temperature sensing devices are used to control the temperature of liquid. Pressure release valves combine with the cover, which is flexible to act as a relief valve, to relieve dangerous internal pressures.

13 Claims, 6 Drawing Figures

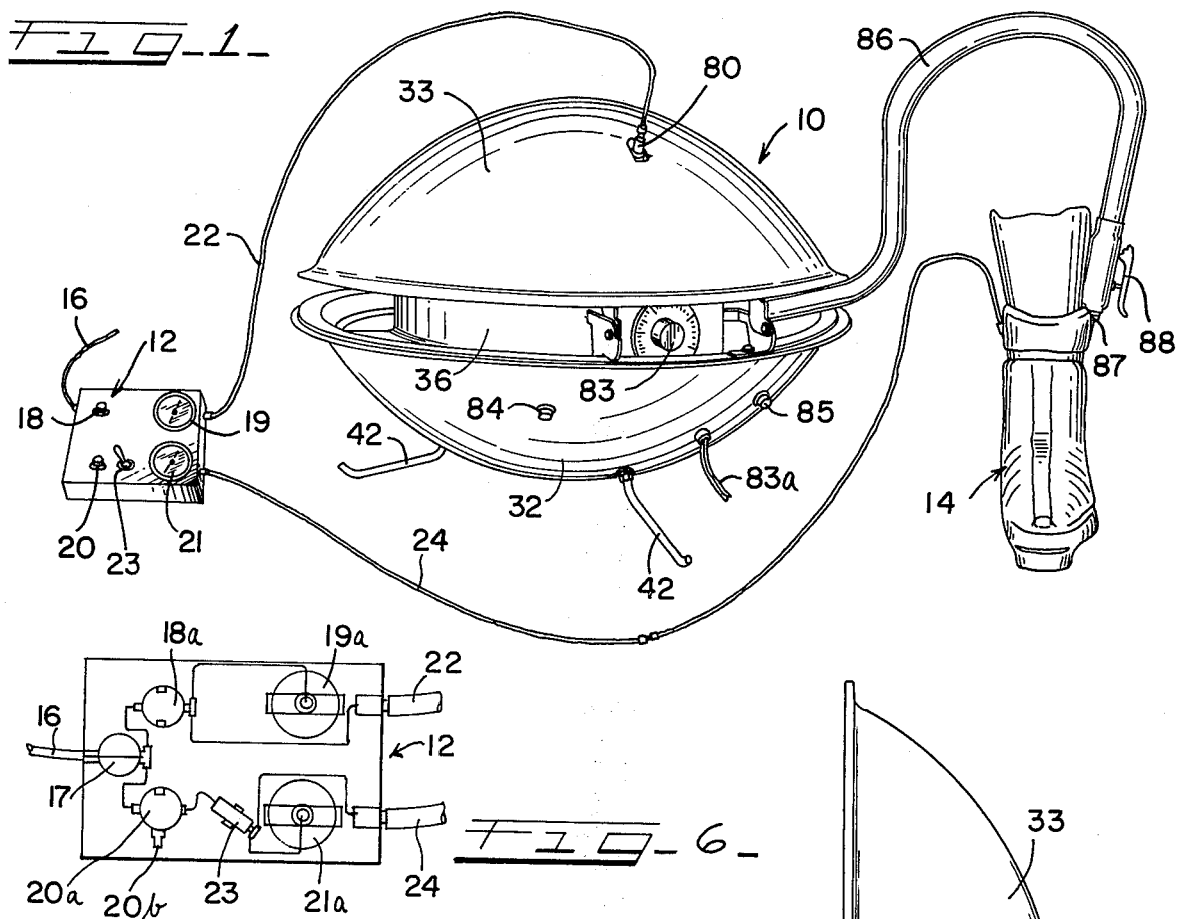
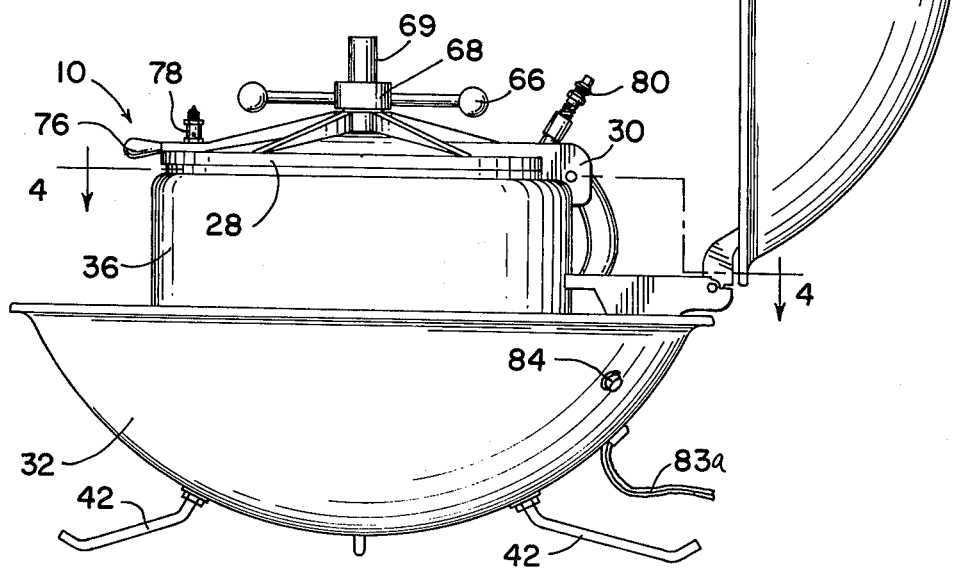

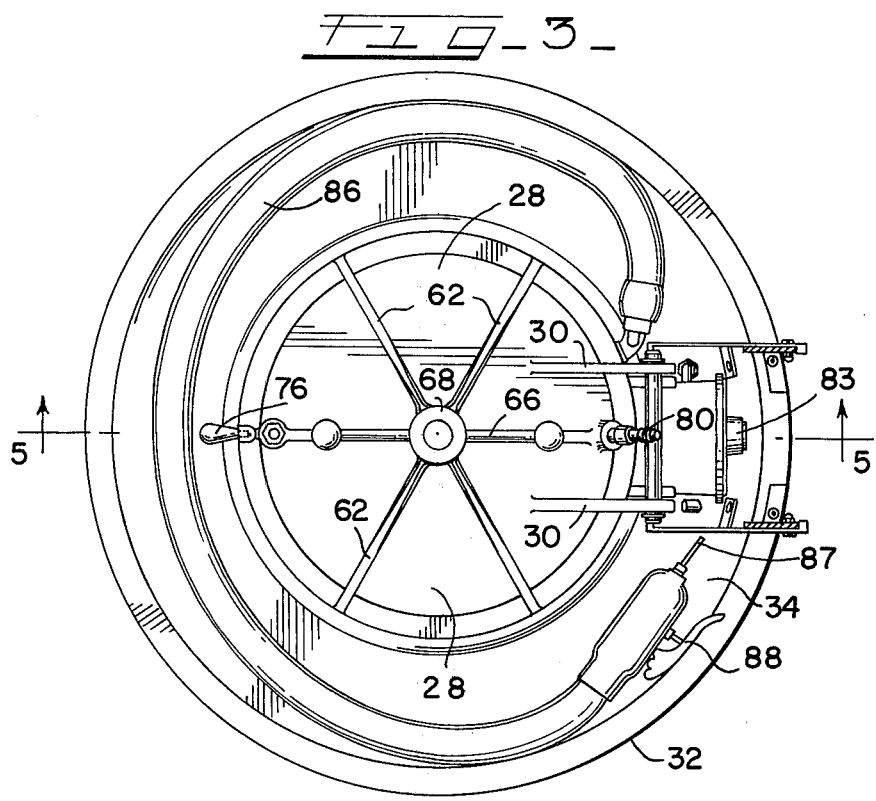
Fig-3-
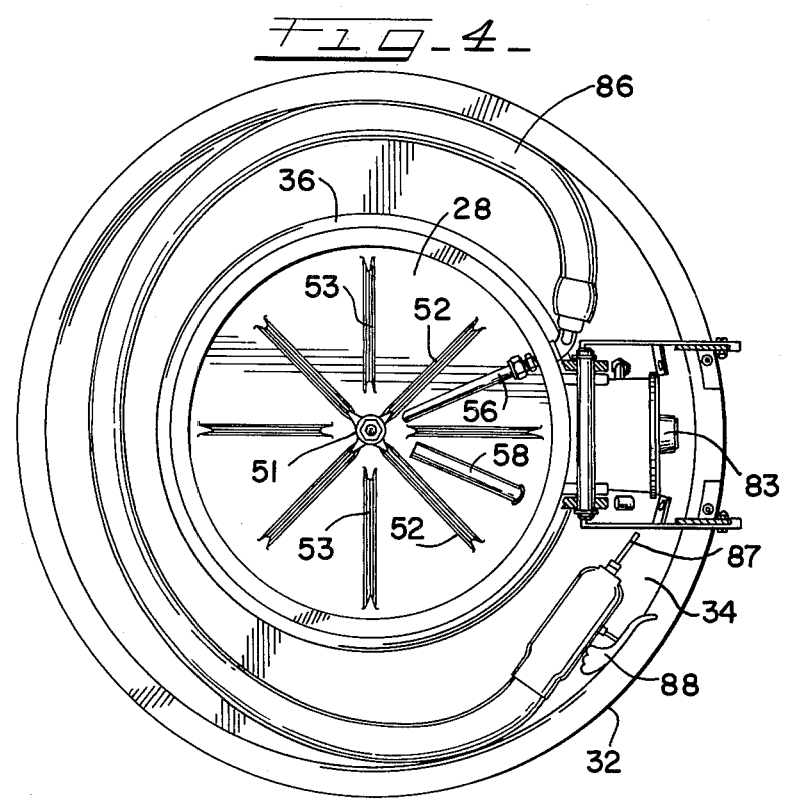
Fig-4-

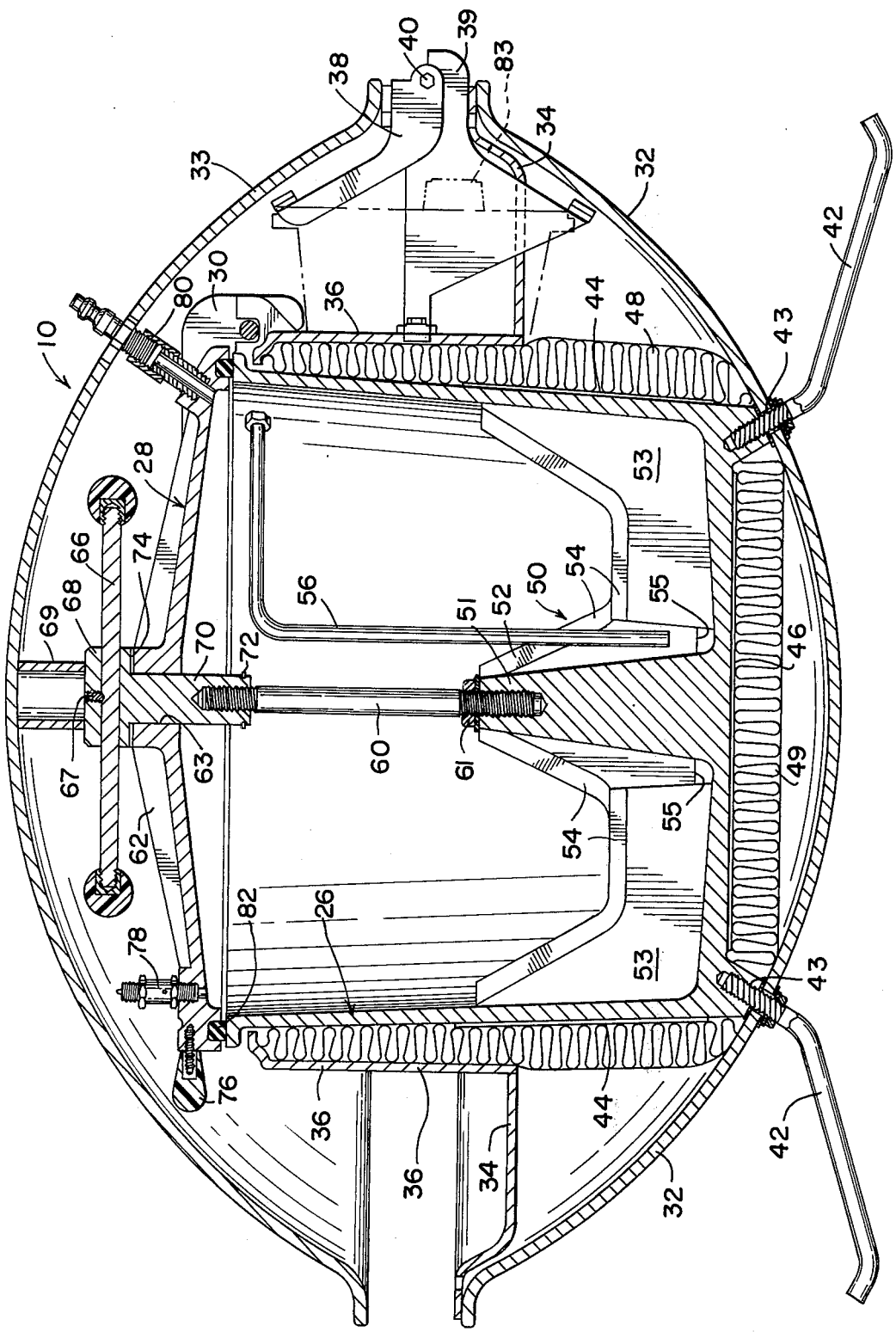

HEATING DEVICE FOR CUSTOM FITTING A SKI BOOT

BACKGROUND OF THE INVENTION

1. Field of the Invention

This invention is directed to a device used in a hot wax method for producing custom fitted ski boots and includes a heating pot having integrally formed heating fins as well as a sealing cover including pressure relief means. Ski boots fitted by a hot wax method for fitting provide personalized, custom fitting. An inflatable fitting bladder may be inserted into a cavity between the boot outer shell and an inner liner. The separate bladder is not essential since the fitting material may be injected directly into the cavity. The skier's foot is placed into the boot and compressed air fills a bladder which assumes the contour of the skier's foot. The ski boot and liner used in the custom fitting method is disclosed in the application of Alden B. Hanson and Chris A. Hanson, title "Ski Boot and Liner Therefor"Ser. No. 216,080, filed June 7, 1972, now U.S. Pat. No. 3,798,799, and which is incorporated by reference herein. After the thermoplastic wax has been liquefied, it is forced into the bladder at a pressure high enough to force out the air in the bladder. When the liquid has completely displaced the air, liquid flow is shut off and the was is allowed to cool and harden to the form of the skier's foot. Should adjustments be required, the bladder may be heated and the wax may be hand pressed into a position of more comfort to the skier.

2. Description of the Prior Art

Prior art heating pots which are used in the hot wax custom fitting procedure generally have provided merely a heating pot unit which receives wax blocks to be melted into a liquid. These devices have generally met with problems resulting from uneven wax heating and consequent thermal gradients which can cause uneven liquid flow and consequent lack of uniform filling of the ski boot. Additionally, prior art devices have had complicated and cumbersome hardware associated with attaching the cover to the heating pot. Also, prior art devices have not provided adequate safety devices to sense undesirable high pressures which may build up within the heating chamber. In some instances they have not provided a means for insuring that the air pressure which forces the hot liquid out of the melt pot and into a boot is disconnected or otherwise neutralized before the cover is removed thus preventing injury which could occur should the cover suddenly release due to internal air pressure.

The present invention provides an improved heat transferring melting pot for uniformly heating wax blocks and producing a fluid having a uniform temperature thereby insuring consistency in filling for custom fitting a ski boot. Also, the melting pot of the present invention provides a cover which may be easily, rapidly, and securely fastened to the pot by means of a centrally disposed rotating handle.

SUMMARY

This invention is directed to an improved device for melting wax blocks or other type of fitting material which must be liquefied before being used as a filler for custom fitting a ski boot. The melting pot provided herein provides a number of enlarged heat transfer surfaces or fins as well as an enlarged heater area, thus providing for rapid melting of wax particles. Automatic temperature controls maintain the liquefied wax at a constant temperature and eliminate fluid temperature gradients which may result in uneven fluid filling and charging of a ski boot and thus interfering with custom fitting.

In operation, solid wax or other similar particles are placed within the heating chamber of the melting pot and may be firmly urged down onto the heat transfer fins for improved heat transfer and rapid melting of the solid particles. The heating pot cover is then secured onto the melting pot portion by rotating a locking handle and assoicated locking stud into the hub of the melt pot member. A light means indicates that current is available at the melt pot. Also, when the automatic heater controls no longer call for heat, thus indicating that the wax has been liquefied to the proper temperature, another light means will be on to indicate that the heater coil is no longer being electrified and the system may be operated. A capillary tube which senses the temperature of the wax within the chamber controls the power to the melt pot heating coils and will cycle the power on and off to thereby maintain constant temperature of the liquefied wax. Thus, when the power is on, the first light means will so indicate and when the heater coils are off the second light means will be cycled on.

The cover of the melt pot includes a pressure relief valve as well as a gasket which seals the members together and which also will allow the high pressures to be released thereby preventing failure or rupture of the melt pot or injury to an operator should the pot be inadvertently opened when unusually high pressures are present. The cover is a dish shaped member with a central hub in which a locking unit is mounted. Tapered strengthening ribs extend radially from the central hub to the edge of the cover and allow the edge of the cover to flex and be lifted for releasing undesirably high pressures which could arise within the heating chamber.

An air supply coupling is also mounted in the pot cover and extends through the adjacent cover of the housing capsule to thereby automatically disconnect the associated air pressure line when the outer cover is rotated to the open position. The covers of both the thermoplastic housing and the melt pot are designed with hinges which permit them to be stored in the generally upright position and maintained in such position while the pot is being charged with wax or cleaned out.

It is desired to provide a melting pot for use in a hot wax custom fitting of a ski boot in which the pot has an improved heating structure for initially melting and maintaining the liquefied wax at a uniform temperature by increasing the heat transfer between the heating element and the interior of the heating chamber by use of heating fins which have sharpened surfaces allowing large wax blocks to be cut and compacted snugly around the heating fins.

Another object of the present invention is to provide a metallic heating pot which is mounted within a thermoplastic or other insulating type of housing which insures that the temperature on the outside of the melt pot is kept at a safe level.

Another object of the invention is to provide a housing for a melt pot wherein a storage tray encircles the melt pot and provides an area for storage of the charging hose, tubing, and other accessories which are used in the hot wax process thereby providing a compact, neat, unit which may be easily stored when not being utilized.

Still another object of this invention is to provide a melting pot having a cover member which is strengthened by reinforcing ribs extending from a centrally disposed hub portion and which are so designed to permit a predetermined amount of cover flexure as pressure within the melt pot rises. Once a predetermined deflection of the cover has been reached due to internal pressure, the cover, in combination with the associated sealing gasket, will function as a valve and release pressure in the melt pot.

Another object of the invention is to provide a melt pot having a cover which is secured to an associated melting pot member by use or a rotatable locking handle having a threaded locking stud conected thereto and which is engageable with a threaded portion of the melt pot to provide a reliable and simple locking arrangement.

Another object of the invention is to provide a heating pot having a number of heat transfer fins including one set of fins being attached to both the bottom and the side of the pot and acting in combination with a second set of heating fins which are attached to both the bottom of the pot and a centrally disposed hub which extends upwardly from the bottom of the melting pot. This arrangement of the heating fin provides for a uniform expansion and contraction due to thermal forces and prevents stress concentrations which could result in fatigue or other type of failures of the melt pot.

These and other objects of the present invention which will become apparent with reference to the attached specification and the claims.

DESCRIPTION OF THE DRAWINGS

FIG. 1 is a pictorial illustration of the melting pot assembly shown in combination with the air control box and a ski boot which is being custom fitted;

FIG. 2 is a front elevational view of the melt pot unit and associated housing with the cover in an open position;

FIG. 3 is a top plan view of the device illustrated in FIG. 2 with a portion of the housing top cover removed for purposes of clarity;

FIG. 4 is a view taken generally along lines 4—4 of FIG. 2; and,

FIG. 5 is a cross sectional view of the melt pot and associated housing taken generally along lines 5—5 of FIG. 3;

FIG. 6 is a diagrammatic view of the air control components contained within the air feed control box shown in FIG. 1.

DESCRIPTION

With reference now to the drawings and in particular to FIG. 1, there is shown the apparatus which is used in custom fitting a ski boot through use of the hot wax process. The essential elements or components used in the hot wax custom fitting process include a heating unit 10 used in conjunction with an air bleed control box 12 which monitors and controls the flow of compressed air into the heating unit 10 and ski boot 14. The ski boot 14 may include a hollow fitting bladder or simply a cavity located between the boot liner and the outer shell portion. The description will be made with reference to using a bladder, but it is to be understood that a cavity alone would be suitable with this invention. After the skier's foot is in the boot 14 the cavity, which can include a bladder, is filled with air. A liquid thermoplastic wax may then be forced into the fitting bladder displacing the air and allowed to solidify to take the form of a skier's foot and thereby provide a custom fitted boot. Air feed line 16 receives compressed air from a small compressor unit (not shown).

As shown in FIG. 6, compressed air is initially received within the control box 12 by a filter 17 which removes moisture, oil or other contaminants such as dust particles, thus preventing damage to the downstream regulators and gauges. On the exit side of the filter 17 the compressed air is divided into two streams, one going to fit regulator 20a, and the other going to the tank regulator 18a. Control knob 18 of the regulator 18a, and knob 20 of regulator 20a may be used to adjust air flow through each regulator. The fit regulator 20a has an automatic bleed device indicated at fitting 20b to increase the response time of the regulator to quickly relieve pressure as wax is flowing into the bladder. Both regulators 18a, 20a are the relieving type, meaning that if downstream pressure is greater than the regulator setting the excess pressure will bleed back through the regulator. A fit gauge 21a is associated with gauge 21 to indicate the pressure within the boot bladder. Gauge 21a is a sensitive gauge generally anticipated as having a range of 0–300 millimeters of mercury, gauge. Similarly, tank gauge 19a has a range of 0–30 p.s.i.g. and monitors pressures within the melt pot 26. Toggle valve switch 23 is located in line between the fit regulator 20a and its assoicated gauge 21a and is used to permit the bladder to be tested for air leaks. For example, prior to filling the bladder with liquid the air leak test is performed by initially filling the bladder with air while the liquid inlet tube of the bladder is clamped off. The air inlet tube of the bladder is coupled with air line 24. After the bladder is inflated in such a manner, the toggle valve switch 23 is closed thus sealing the bladder and feed line 24. Any drop in bladder air pressure, indicating a leak, will be indicated by the dial 21 of fit gauge 21a and require insertion of another bladder prior to the custom fitting. After the bladder test, the toggle valve 23 is open to permit flow of air from the bladder as fluid is being filled into the bladder via hose 86.

Thus, high pressure air fed into the control box 12 undergoes a pressure drop which may be regulated by the control knobs 18 and 20. This pressure regulation is necessary because the bladder surrounding the skier's foot is initially filled with compressed air via feed line 24 to open it up and provide a void area into which a displacing liquefied wax at a higher pressure will flow. Melt pot air feed line 22 proivdes a positive pressure within the melting chamber to force the liquefied wax out through the associated hose for filling the ski boot bladder.

Referring now to FIG. 5, the specific structure of the heating unit is shown. A melting or heating pot member 26 provides a space into which a fitting material such as solid wax is inserted for melting. A cover unit 28 is connected to the heating pot 26 by a hinge member 30 which permits the cover to be rotated away from the pot and stored in a generally upright vertical position while the pot is being charged with wax particles or being cleaned. A lower encapsulating member 32 is associated with an upper housing or cover 33 to provide an attractive, enclosed insulated structure which isolates dangerously warm surfaces from an operator thereby preventing burns. The lower housing 32 has a generally bowl shaped contour for receiving the pot 26. A dish shaped storage shelf or liner 34 surrounds the pot unit 26 and includes a portion attached to the lower housing 32. Associated with the disc 34 is a generally vertically extending collar portion 36 which extends upwardly from the liner 34. Thus, the combination of the lower pot housing 32, the shelf or liner 34 and the collar 36 combine to completely encircle the lower pot housing 26 and thereby isolate any hot surfaces.

A hinge unit comprised of an upper hinge portion 38 attached to the upper housing 33 and the lower hinge portion 39 attached to the lower housing and including a portion extending to the collar 36 are pivotally joined to permit the upper housing to be rotated into a slightly over vertical position for storage when the pot is being cleaned or charged with a thermoplastic type of wax. The hinge pivot pin is designated by the numeral 40.

The heating unit pot 10 also includes mounting legs 42 which extend downwardly and outwardly from the lower pot housing 32 and are threaded into attaching lugs 43 of the heating pot 26. These leg portions are generally long thin members which are intended to mount the heater unit above a supporting surface thereby preventing damage or discoloration of the surface due to heat generated within the melting pot. The leg members 42 are also long enough to provide for dissipation of any heat conducted from the pot before the heat is transferred to the supporting portion of the mounting legs thus preventing discoloration or damage to a supporting surface from the mounting legs.

The melting pot 26 is heated by means of an upper side heater 44 which encircles the sides of pot 26 and combines with a bottom heater member 46. Adjacent the back of each of numeral 50 which includes a vertically extending tapered hub 51 units 44 and 46 isside insulation 48 and the bottom insulation 49 which serves to prevent heat flow to the adjacent lower housing.

To aid in transferring heat from the heaters into the melting chamber and to the wax, a number of heating fins are provided. Located centrally within the pot 26 is a heating spider designated by the numeral 50 and a plurality of radially extending fins 52 extending outwardly therefrom. Associated with these centrally mounted fins 52 are a plurality of fins 53 which are disposed along the bottom and the side wall of the lower pot 26. The fins 52 and 53 have tapered or wedge shaped edge sections 54 which facilitate breaking up of large wax sections which may be compacted around the fins to aid in speeding up melting of the wax. At the bottom corner of each fin 52 there is an opening or a relief 55. This relief 55 is to provide for flow of liquefied wax around the hub to evenly distribute the wax at the bottom of the pot.

The lower pot 26 also includes an exit tube 56 which is attached at the top of the pot 26 and extends downwardly into the liquid storage section to permit liquefied wax to be forced from the melt pot under pressure.

Also mounted within this lower melt pot housing 26 is a thermowell or pipe shaped housing 58 which stores a capillary tube used to sense the temperature of liquefied wax. (see FIG. 4) This solid pipe portion 58 is necessary because solid wax particles often are forced into the pot to increase the heat transfer area between the metallic pot portions and the wax to speed up melting of the wax. During this forcing of the wax particles into the pot, an unprotected capillary tube could be damaged.

The cover 28 which is used to seal the lower melt pot housing 26 may be attached to the upwardly extending center post 60 which provides a locking connection between the cover 28 and the melt pot 26. This center post 60 is mounted in the hub 51 and held in place through the use of a lock nut 61.

The cover member 28 includes, more particularly, a plurality of reinforcing or strengthening ribs 62 which extend radially from a centrally disposed hub having an opening 63 extending therethrough. Reinforcing ribs 62 function as reinforcing cantilever beams to permit a limited deflection of the outer periphery or rim of the cover in response to internal pressures within the melting pot. This limited deflection thereby permits the cover to function as a flap type of valve which will relieve internal pressures and add an additional safety feature to the invention. Prior covers which were attached to the melting pot included locking studs and hold down handles around the periphery and would not allow for escape of undersirable and potentially dangerous high pressures which can be created in the melting zone should a component malfunction occur.

Associated with the cover 28 is a locking handle 66 which is contemplated as being a generally elongated pin having graspable rounded knobs at each end. The locking handle 66 is of sufficient length to provide a level of locking torque which will securely hold the cover on the melting pot 26. The locking handle 66 is attached to the head of a rotatable shaft 68 through which the handle 66 extends. As shown in FIG. 5, the locking handle may be secured in place with a set screw 67. A cylindrical spacer and stop 69 which abuts the inside top of the upper housing 33 is positioned on the head of shaft 68. Additionally, the rotatable shaft 68 has an elongated body portion 70 which extends through the opening 63 of cover 28. Body portion 70 includes a threaded opening adapted to receive one end of center post 60. At the end of the body section 70 is a locking ring 72 which prevents the handle assembly and associated handle shaft from being removed from the cover 28. A flat disc shaped bearing and gasket member 74 is positioned between the underside of the locking shaft 68 and the top of the cover 28 to seal the opening and at the same time permit smooth rotation of the shaft 68 as the cover is being tightened down.

Spaced across the cover 28 from the hinge 30 is a lifting handle 76 which may be of any convenient form to provide for easily moving the cover into an open position to permit wax to be charged into the melt pot or to allow for clean out.

As an additional safety feature, in addition to the relief provision which is present due to the design of the cover, the cover may also include a pressure relief valve 78 which is set at a predetermined release level to relieve internal pressure and prevent damage to the heating unit or to operating personnel.

The outer cover unit 28 also includes an opening for attachment of an air line connector 80 which permits attachment of the melt pot air feed line 22. As shown in FIG. 5, connector 80 is contemplated as extending outward from the melt pot and through an opening in the upper housing cover 33. Thus when the air line 22 is attached to the connector 80 it will be disconnected automatically when the upper housing 33 is pivoted into the open position. This automatic release relieves air pressure from inside the melt pot and thereby prevents the pot cover from opening rapidly which could cause an injury.

A gasket 82 is fitted about the outer periphery of cover 26 and forms a seal between the melt pot 26 and the associated cover 28. The gasket 82 is resilient enough to provide an adequate seal yet rigid enough to move with the cover when a high pressure causes upward deflection of the cover to permit high pressure gasses to escape.

As shown in FIG. 1, a temperature control box 83 is mounted on the storage shelf 34 in the area adjacent the hinges 38 and 39. The temperature control 83 may be of any conventional design having a calibrated scale indicating temperatures. Thus by setting a temperature on the control box 83 an analogous temperature will be maintained within the melt pot 26. The temperature control box 83 is connected with the capillary tube mounted within the thermowell pipe housing 58, which was described earlier, and which senses the temperature of liquid within the melt pot.

An electric power line 83a may be attached to the heating unit 10 in any convenient manner to provide alternating current. Additionally, monitoring lights are provided on the outside of the lower housing 32 and include a light 84 which will indicate when the power line 83a is plugged in or in a state which will provide heating current to the melting pot. A second light 85 is connected to the control box 83 and will only turn on when liquid within the melting pot has reached the temperature preset on the temperature control box 83. Thus, when light 85 is on, the melting pot 26 has reached operating temperature and the heaters 44, 46 are turned off.

A liquid conducting hose 86 is coupled with the exit tube 56 and has a hose outlet 87 adapted to connect with a bladder inlet tube within the ski boot 14 for providing liquefied wax to the bladder. The hose 86 includes a valve which is controlled by handle 88 and which allows for selective filling of a ski boot bladder. Hose 86 also includes a heating element extending along the length of the fluid carrying tube and which will maintain flowing wax in a liquid state for easy filling of a ski boot bladder.

OPERATION

With the structural elements provided with this invention, the process of providing a custom fitted ski boot by using a thermoplastic wax fitting compound has been greatly facilitated. To make such a custom made ski boot, it is necessary to first charge the heating unit 10 with an adequate supply of fitting wax which is generally provided in bars and which may be pressed onto the cutting edges 54 of the heat transfer fins 52 and 53. The proper temperature for melting the wax is then set by the temperature control box 83 and heat is quickly transferred to the wax bars and to produce rapid liquefaction. The air feed line 24 is attached to the ski boot bladder after a skier's foot has been inserted into the boot. Air is then fed into the bladder and expands it into conformity with the outline of a skier's foot. The bladder air leak test, as described earlier, is then performed to insure the soundness of the bladder. This void created in the ski bladder later is filled by liquefied wax which displaces the air in the bladder. Air feed line 22 is attached to connector 80 and provides pressure to the inside of the melt pot. This positive pressure is used to force liquefied wax through the exit tube 56 and hose 86 for eventual filling of a ski boot bladder. Thus the fitting material is filled into the air space of a bladder as the air in the bladder is bled off. For this purpose, it is necessary that the air pressure supplied to the melt pot be higher than the air pressure provided to the bladder to permit the fluid to displace the air. Compressed air which flows into the air feed line 16 may be reduced to a desired pressure through adjustment of either of the regulator knobs 18 and 20 of the air feed control box.

Thus it is noticed from this disclosure that this invention provides an improved heating unit 10 for melting, storing and conveying liquefied wax to a ski boot and aiding in the making of a custom fitted, personalized, ski boot. The increased heat transfer surfaces provided by the heat conducting fins of this invention quickly melt a thermowax and maintain the wax at a relatively uniform temperature throughout thus insuring a wax consistency which will provide for uniformly filling of the ski boot bladder. Additionally, the inherent safety feature provided by the flexible cover 26 in combination with both the pressure relief valve 78 and the automatic air line disconnect feature insure that no injuries or damage result from operating of this melting unit.

The foregoing description and drawings merely explain and illustrate the invention and the invention is not limited thereto, except insofar as the appended claims are so limited, those who are skilled in the art who have the disclosure before them will be able to make modifications and variataions therein without departing from the scope of the invention.

What is claimed is:

1. A heating unit for heating a fitting material for use in making custom fitted ski boots wherein a ski boot is provided with an inner liner and an outer shell and said liner provides a cavity adapted to receive the fluid fitting material, said heating unit comprising:
   a rounded heat-conducting heating pot and a sealing cover member, and said pot and cover being encapsulated within a thermally insulating shroud having upper and lower housings;
   said heating pot having a bottom and sides extending upwardly therefrom;
   said heating pot having a heating chamber and an air supply connector to provide pressure in said heating chamber, an electric heating element attached to said heating pot and in heat conducting relationship therewith for melting said fitting material variations
   said heating pot also including integral heat transferring fin means in said heating chamber for conducting heat into the heating chamber to melt and provide a heated fluid fitting material;
   locking means for securely attaching the cover member to the heating pot and said locking means including connecting means selectively operable for releasably attaching said cover member atop the heating pot; and,
   outlet means including an exit duct in said melting pot and an outlet feed line for transferring heated fluid fitting material from the heating unit.

2. The heating unit of claim 1, and:
   said cover member including a generally dish shaped member having a central hub portion with an opening cooperative with the locking means, and said cover member also including radially extending reinforcing ribs extending outwardly from the hub portion;

said reinforcing ribs having a tapered contour and including a thicker section adjacent the hub and a thinner section adjacent the outer edge of the cover member and providing a flexible cover which is deflectable under the influence of internal pressures within the heating chamber to thereby allow the cover member to function as a relief valve.

3. The heating unit of claim 1, and:
said heating pot including a centrally disposed bottom protrusion;
said heat transferring fin means including a plurality of first fin members extending radially outwardly of said bottom protrusion and said first fin members being attached to both the protrusion and to the bottom of the heating pot;
said heat transferring fin means also including a plurality of second fin members positioned between said first fin members and in radial alignment with the bottom protrusion and having means attached to both the bottom of the heating pot and to the side of the heating pot.

4. The heating unit of claim 1, and:
said lower housing of said insulating shroud including a spheroidal mounting member adapted to receive the heating pot and said housing also including an annular service tray positioned about the heating pot and extending outwardly therefrom.

5. The heating unit of claim 4, and:
a collar member extending generally upwardly and parallel with the heating pot from the service tray and combining with the lower housing and the service tray to provide an enclosure surrounding the heating pot.

6. The heating unit of claim 1, and:
said heating element including an upper heater in heat conducting relation with the sides of the heating pot and said heating element also including a bottom heater in heat conducting relation with the bottom of the melting pot.

7. The heating unit of claim 1, and:
said air supply connector being releasably attached to said heating unit and including means operatively associated with said upper housing whereby opening movement of the upper housing will disconnect the air supply connector to release said air pressure from said heating pot.

8. The heating unit of claim 1, and:
temperature sensing means positioned at the lower portion of the heating unit and being housed in a protective cover to permit the temperature sensing means to be in heat conducting contact with heated fitting material within said heating pot;
manually operable temperature regulating means having a calibrated dial and having means for presetting the temperature within said heating pot and said temperature regulating means having control means operatively connected with both the temperature sensing means and with said heating element for automatically controlling the temperature within the heating chamber.

9. The heating unit of claim 1, and:
an air control unit having a compressor line connected thereto for receiving compressor air;
said air control unit including a first air line for feeding pressurized air to the heating unit and and,
said air control unit including pressure regulating means for providing high pressure air to the heating unit.

10. The invention according to claim 9, and:
said pressure regulating means including a pot regulator for controlling air feed into the heating pot.

11. The invention according to claim 10, and:
said fitting regulator having automatic air bleed means.

12. The heating unit of claim 1, and:
a flexible hose having an outlet element for injecting fluid fitting material into the ski boot and said flexible hose also including valve means for selectively controlling flow of said fluid fitting material.

13. The heating unit of claim 1, and said heating unit including:
support legs extending downwardly and outwardly from the lower housing and including a portion extending through the lower housing into mechanical locking and connecting contact with the heating pot whereby the bottom of the lower housing is spaced above a supporting surface.

* * * * *

UNITED STATES PATENT OFFICE
CERTIFICATE OF CORRECTION

PATENT NO. : 3,917,122
DATED : November 4, 1975
INVENTOR(S) : Jack C. Swan, Jr.; Donald W. Bertetto; Chris A. Hanson It is certified that error appears in the above-identified patent and that said Letters Patent are hereby corrected as shown below:

Page 1, right column, at end of abstract, add --Air pressure is provided to force the heated fitting material from the melting unit.--; column 1, line 27, change "was" to --wax--; column 5, line 36, following "of" (second occurrence), delete "numeral 50 which includes a vertically extending tapered hub 51", insert --the heater--; column 5, line 37, change "isside" to --is side--; column 5, line 43, following "50", insert --which includes a vertically extending tapered hub 51--; column 8, line 50, following "material", delete "variations"; column 10, line 22, change "and and," to --, and:--.

Signed and Sealed this twenty-fourth Day of February 1976

[SEAL]

Attest:

RUTH C. MASON
Attesting Officer

C. MARSHALL DANN
Commissioner of Patents and Trademarks